US008289641B1

(12) United States Patent
Emami

(10) Patent No.: US 8,289,641 B1
(45) Date of Patent: *Oct. 16, 2012

(54) PARTIAL DATA STORAGE DEVICE FAILURES AND IMPROVED STORAGE RESILIENCY

(75) Inventor: Tim K. Emami, San Jose, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/239,671

(22) Filed: Sep. 22, 2011

Related U.S. Application Data

(63) Continuation of application No. 12/106,020, filed on Apr. 18, 2008, now Pat. No. 8,049,980.

(51) Int. Cl.
G11B 27/36 (2006.01)
G11B 5/09 (2006.01)
G06F 13/00 (2006.01)
G06F 13/28 (2006.01)

(52) U.S. Cl. ............ 360/31; 360/53; 711/114; 714/6.21

(58) Field of Classification Search .................. None
See application file for complete search history.

(56) References Cited

U.S. PATENT DOCUMENTS 8,049,980 B1 * 11/2011 Emami ...................... 360/31

* cited by examiner

*Primary Examiner* — Daniell L Negron
(74) *Attorney, Agent, or Firm* — Blakely, Sokoloff, Taylor & Zafman LLP

(57) ABSTRACT

A mass data storage system including a data storage device comprising block groups each comprising a plurality of data blocks determines when one of the block groups is faulty and the data storage device continues to operate as a partially failed data storage device with respect to the remaining block groups which are not faulty. A striped parity data storage device array comprises data storage devices capable of operating as partially failed data storage devices allows copying of data from the block groups not associated with determined to be faulty of a partially failed data storage device to a spare data storage device which reduces the amount of data that must be rebuilt in the rebuild process, thereby reducing the amount of time the array spends in degraded mode exposed to a total loss of data caused by a subsequent data storage device failure.

20 Claims, 7 Drawing Sheets

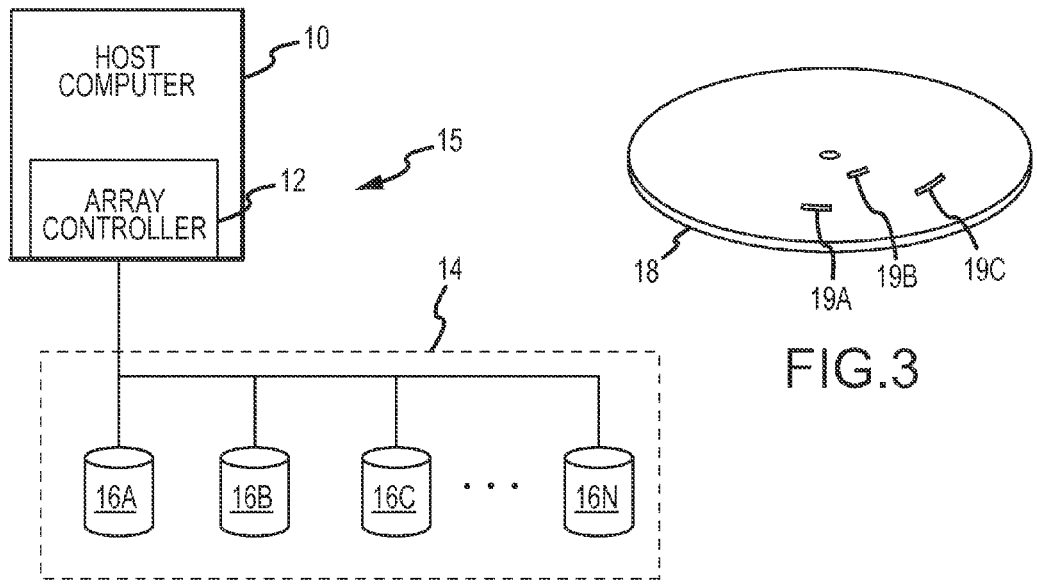
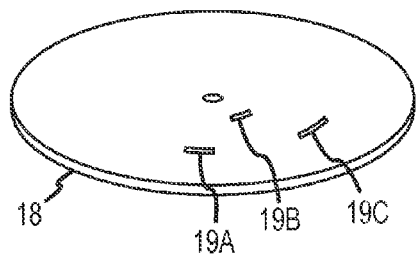
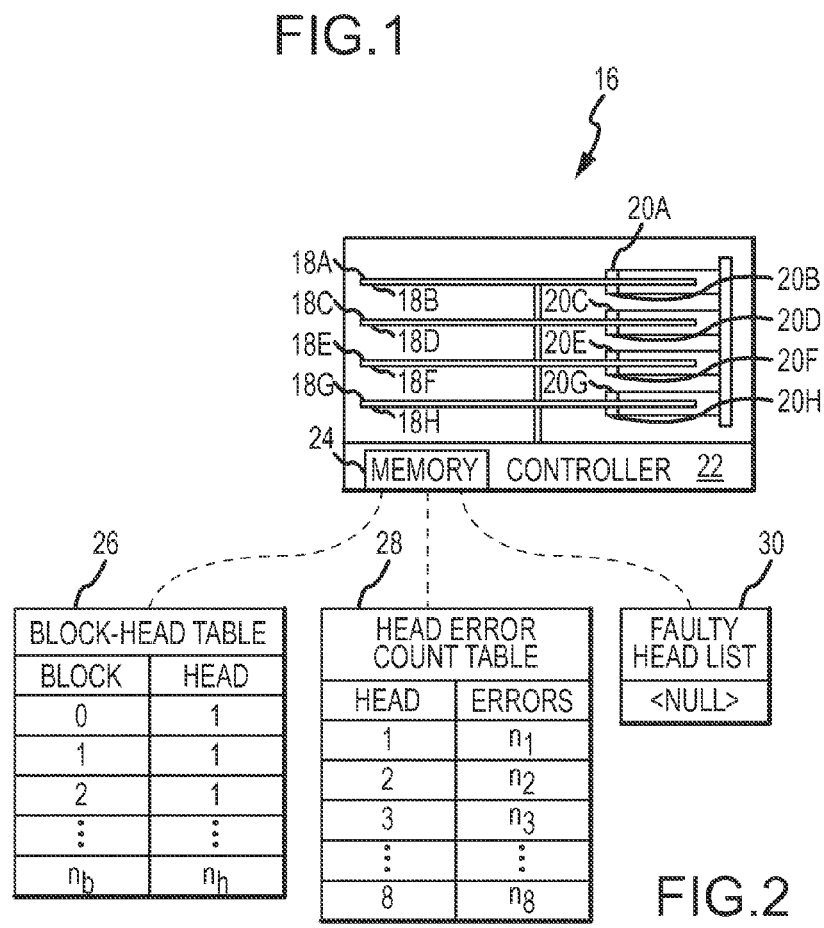

US 8,289,641 B1

PARTIAL DATA STORAGE DEVICE FAILURES AND IMPROVED STORAGE RESILIENCY

CROSS REFERENCE TO RELATED APPLICATION

This is a continuation of U.S. patent application Ser. No. 12/106,020, filed Apr. 18, 2008, now U.S. Pat. No. 8,049,980, issued Nov. 1, 2011.

FIELD OF THE INVENTION

This invention relates to data storage devices and striped parity data storage device arrays. More particularly, the invention relates to a new and improved data storage device which continues to operate despite having a faulty block group to allow data to be retrieved from the non-faulty block groups of the data storage device and also relates to the improved performance and reduced risk of data loss when such data storage devices are used in a striped parity data storage device array.

BACKGROUND OF THE INVENTION

Hard disk drives ("disks") are common data storage devices used in conjunction with computers. Most disks have multiple circular magnetic platters which rotate on a common spindle to allow heads mounted on a common actuator to read and write data from and to both the bottom and top magnetic recording surfaces of each platter. Disks eventually suffer enough wear and tear through prolonged use that they become unreliable as a data storage medium. Typically, when a disk fails it enters a fault mode and ceases to allow access to the data that was written or stored on it. A failed disk is typically replaced with a new disk and the unaccessible data that was written on the failed disk is restored from a backup of the data and written onto the replacement disk. Restoring data from a backup can be a lengthy process during which services provided by the computer that depend on the data are usually unavailable.

One technique for guarding against data loss from a disk failure is to use a striped parity disk array ("SPDA"). An SPDA comprises several disks across which the data is striped and on which parity information is stored. Striping refers to a body of data which is broken up into smaller units and written to multiple disks. Parity information is generated from the data and allows rebuilding of the body of data if a disk within the SPDA fails. Some common well-known implementations of SPDAs are disk arrays using standard Redundant Array of Independent (or Inexpensive) Disks (RAID) levels 3-6. A single set of parity information is generally referred to as single parity and two sets of parity information is generally referred to as dual parity.

An SPDA generally requires the storage equivalent of a whole disk to be devoted to storing each set of parity information. A single parity SPDA with N disks would therefore have the storage equivalent of N−1 disks available for data storage, and a dual parity SPDA with N disks would have the storage equivalent of N−2 disks available for data storage. The parity information may be entirely on one disk (such as RAID levels 3 or 4), two disks or striped across all of the disks in the SPDA (such as RAID level 5). If one of the disks in an SPDA fails, the SPDA can continue to operate to allow access to the data. Typically, a failed disk in an SPDA is replaced with a spare disk and then the spare disk is written with data rebuilt from the data and parity information written on the other disks in the SPDA.

When a disk containing data in an SPDA fails, the SPDA is considered to be operating in degraded mode. Performance of an SPDA is adversely affected when the SPDA is in degraded mode due to the need to process parity information with available data in order to rebuild the missing data from the failed disk. Data is usually unrecoverable from a single parity SPDA if a subsequent disk fails while the SPDA is in degraded mode because the SPDA no longer has the redundancy that the parity information provided. It is therefore desirable to minimize the amount of time an SPDA spends in degraded mode.

Usually, an SPDA controller manages the operation of the SPDA and the disks within the SPDA and presents the SPDA to a host computer as a single storage container. An SPDA controller, such as a RAID controller that supports RAID levels 3-5, may be implemented in either software or hardware. SPDA controllers typically allow for the use of a hot spare disk ("hot spare"). A hot spare is an extra disk connected to the SPDA controller that can be used by the SPDA controller to automatically replace a failed disk in the SPDA, reducing the amount of time the SPDA spends operating in degraded mode. When a disk in the SPDA fails, the SPDA controller will typically remove the failed disk from the SPDA and add the hot spare to the SPDA thus making the hot spare a member disk of the array. The SPDA controller then rebuilds the data that was on the failed disk by using the data and parity information on the other disks in the SPDA, and writes this data to the extra disk which is now a member of the SPDA.

The continued evolution of disk storage technology has increased the storage capacity of new disks. As the storage capacity of new disks has increased so has the storage capacity of typical SPDAs. The increased storage capacity of typical SPDAs has also increased the time it takes to rebuild the typical SPDA. Longer rebuild times have resulted in greater risks or incidences of data loss due to second disk failures while the SPDAs are operating in degraded mode.

SUMMARY OF THE INVENTION

This invention relates to allowing a data storage device to continue to operate even though one of the block groups of a multi block group data storage device is unable to reliably read or write data. A data storage device which is unable to reliably read or write data through one of its block groups but which can read or write data through the other block groups is herein referred to as a "partially failed data storage device." By allowing a partially failed data storage device to continue to operate despite a problem associated with one of the block groups, some of the data on the data storage device can be read from the data storage device and copied to a spare replacement data storage device. As much data as possible can be copied from the partially failed data storage device to a spare data storage device, and any unrecoverable data on the partially failed data storage device can be rebuilt from the other data storage devices in a striped parity data storage device array. Since copying data from data storage device to data storage device is much faster than rebuilding data in a rebuild process, the time the array spends in degraded mode is reduced. Reducing the time the array spends in degraded mode reduces the chance that a second data storage device in the array will fail while the array is in degraded mode, thereby reducing the chance that all of the data on the array will become unrecoverable. Reducing the time the array spends in degraded mode also reduces the extent of the adverse performance impact suffered by applications which rely on the array.

One aspect of the invention relates to a method of reducing the risk of data becoming unavailable in a data storage system. The data storage system includes a plurality of data storage devices each having a plurality of physical blocks to which data is written to in write operations and from which data is read in read operations, each data storage device having a plurality of block groups each associated with a subset of the plurality of physical blocks. The method involves recognizing read errors occurring in response to read operations; associating one of the block groups with each read error; counting the number of read errors associated with each block group; determining any one block group to be faulty when the counted number of read errors for that any one block group exceeds a predetermined threshold value; copying data from the non-faulty block groups of the data storage device having the faulty block group to another data storage device; and restoring data previously stored in the faulty block group to the another data storage device other than by directly copying the data from the faulty block group.

Another aspect of the invention relates to a method of reducing the rebuild time of a striped parity data storage device array. The method involves determining any block group of any member data storage device to be faulty when errors associated with the any block group meet a predetermined threshold; copying data from the non-faulty block groups of the member data storage device having the faulty block group to the spare data storage device; and restoring data to the spare data storage device that was previously written to the block group determined to be faulty other than by copying the data from the faulty block group.

Yet another aspect of the invention involves a data storage system. The data storage system includes a plurality of data storage devices which are organized into an array, at least one of the data storage devices being a member and one a spare. Each of the data storage devices having a plurality of physical blocks for storing data during write operations and for supplying data during read operations, a plurality of block groups is each associated with a different plurality of the physical blocks for each of the data storage devices. A device controller of each data storage device designates a block group as faulty when read errors for physical blocks of the block group meet a predetermined threshold. An array controller controls the device controllers to (a) read data from the block groups of the member not designated as faulty and to write that data to the spare; and (b) rebuild data onto the spare written to the faulty block group; and (c) thereafter perform subsequent read and write operations on the spare which would otherwise be addressed to the member having the faulty block group.

Other aspects of the invention, and a more complete appreciation of the present invention, as well as the manner in which the present invention achieves the above and other improvements, can be obtained by reference to the following detailed description of presently preferred embodiments taken in connection with the accompanying drawings, which are briefly summarized below, and by reference to the appended claims.

BRIEF DESCRIPTION OF THE DRAWINGS

FIG. 1 is a simplified block diagram of a host computer and a striped parity disk array ("SPDA") containing a plurality of disks incorporating the present invention.

FIG. 2 is a schematic mechanical diagram of multiple platters and heads of one of the disks of the SPDA shown in FIG. 1.

FIG. 3 is a perspective view of a surface of a platter of the disk shown in FIG. 2.

DETAILED DESCRIPTION

Figure 4:
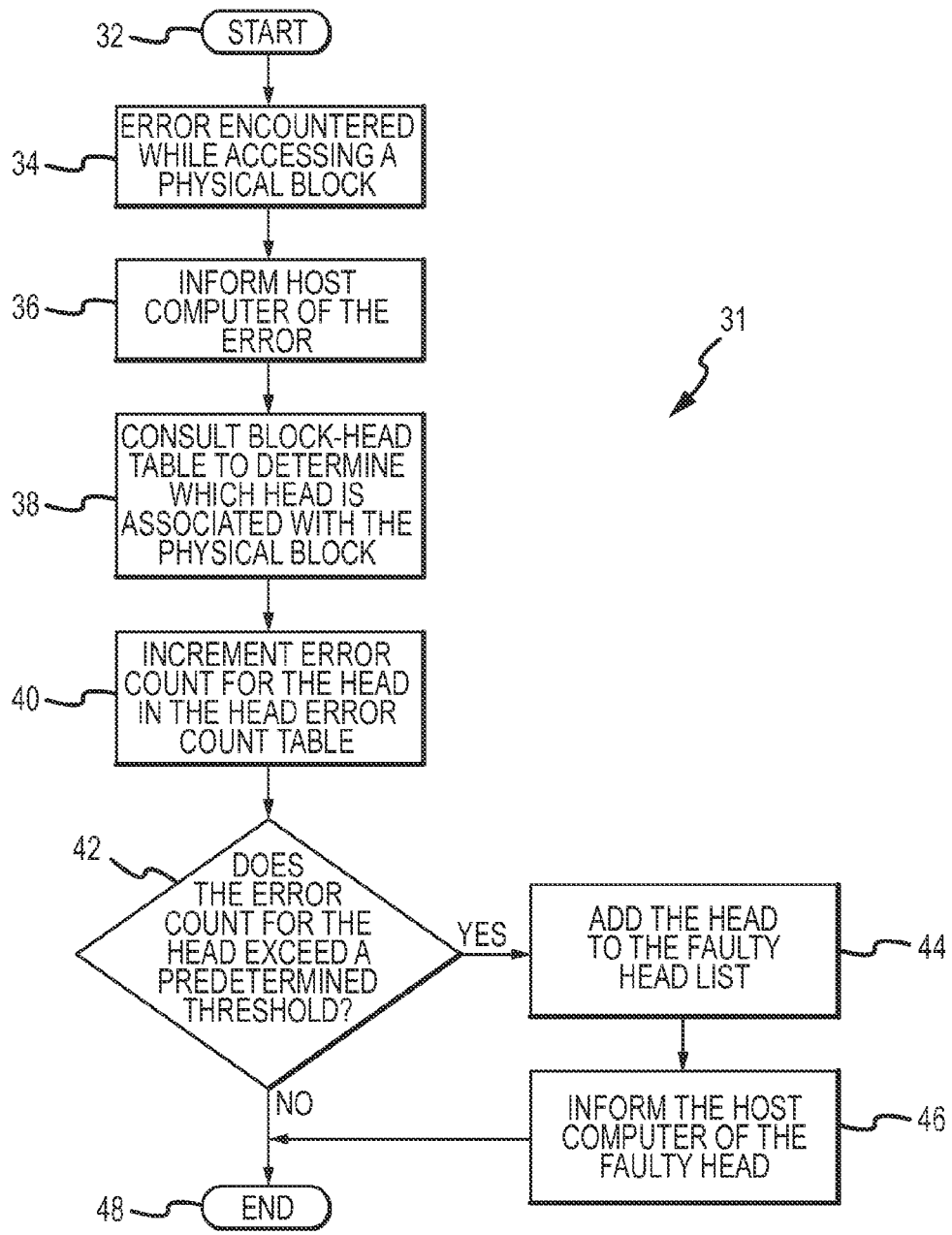
FIG. 4 is a flowchart of exemplary logic executed by a disk controller of the disk shown in FIG. 2 for detecting a faulty head.

A host computer 10, array controller 12, striped parity disk array ("SPDA") 14, and a plurality of disks 16A-16N which implement the present invention and which are collectively referred to as mass data storage system 15 are shown in FIG. 1. The array controller 12 within the host computer 10 manages the SPDA 14 formed by the plurality of disks 16A-16N to which the host computer 10 is connected. The array controller 12 presents the SPDA 14 to the host computer 10 as a single disk, even though the SPDA 14 is composed of several individual disks 16A-16N. The array controller 12 is implemented in software but may alternatively be implemented in hardware of the host computer 10.

The characteristics of each of the disks 16A-16N is represented by the single disk 16, shown in FIG. 2. The disk 16 comprises several platters, with recording surfaces or platter surfaces 18A-18H, several heads 20A-20H, a disk controller 22, and a memory 24. The heads 20A-20H each read data from and write data to one of the platter surfaces 18A-18H. The disk controller 22 controls the operation of the heads 20A-20H and the platter surfaces 18A-18H and communicates with the array controller 12 and the host computer 10 to perform data read and write (input and output or I/O) commands. The disk controller 22 uses the memory 24 to store information related to the heads 20A-20H and the instructions for operating the disk 16.

In regard to the functionality of the present invention, three data structures reside in the memory 24 of the disk controller 22: a block-head table 26, a head error count table 28, and a faulty head list 30. These three data structures enable the disk controller 22 to track read and write errors associated with each of the heads 20A-20H and to facilitate the identification of faulty heads.

A significant percentage of disk failures are related to problems with a single head of a disk. Often times the failure of a single head does not mechanically impair the operation of the other heads on the disk. Presently available disks go into a fault mode and cease to operate when the disk controller detects a serious problem when one of the heads 20A-20H does not reliably read or write data. By programming the disk controller 22 to inform an attached host computer 10 of such a faulty head and causing the disk 16 to remain operational instead of putting the disk 16 into a fault mode when a faulty head is detected, the host computer 10 has the option to copy as much data off of the platter surfaces 18A-18H as possible from the ones of the heads 20A-20H of the disk 16 that are still operational. The exemplary data structures 26, 28 and 30, and the operations represented by the logic-flow in FIG. 4 constitute an example of how a disk 16 can track read and write errors associated with heads 20A-20H and report them to the attached host computer 10 to identify a partially failed disk.

The block-head table 26, head error count table 28, the faulty head list 30 and the functionality which facilitates the identification of a faulty head 20A-20H and the continued operation of the disk in a partially failed condition preferably reside in the memory 24 of the disk controller 22.

The block-head table 26 (FIG. 2) associates physical blocks with specific heads 20A-20H. Blocks are the smallest unit of data with which disks perform read or write operations. A physical block is the actual location on a platter surface in which data is stored. Physical blocks 19A, 19B and 19C are shown on a platter surface 18 in FIG. 3. The address of a physical block is typically in a format known as cylinder head sector (CHS) format, from which the particular head 20A-20H that accesses the physical block can be determined. Modern disks also use an addressing scheme called Logical Block Addressing (LBA) which associates logical block numbers or addresses with physical block addresses and which presents the storage area available on the disk to a host computer as a range of logical block numbers which are correlated to the physical blocks.

When an error occurs during a read or write operation in one of the disks 16A-16N of the mass data storage system 15 for a particular physical block, the disk controller 22 identifies the head 20A-20H that is associated with that block by searching the block-head table 26 for the physical block and its associated head 20A-20H.

The head error count table 28 tracks the number of errors that are associated with a particular head. A separate variable indicating a cumulative error count is stored for each head 20A-20H in the head error count table 28. After a head 20A-20H has been identified as being associated with a particular block which has been associated with a read or write error, the error count variable for that head 20A-20H is incremented in the head error count table 28.

A head 20A-20H is determined to be faulty when the error count associated with that head 20A-20H exceeds a certain number value, referred to herein as a "predetermined threshold." The predetermined threshold is preferably a large enough number so that when the error count of a head 20A-20H exceeds the threshold, there is a high probability that the head is faulty.

The comparison of the error count for each head 20A-20H to the predetermined threshold preferably occurs immediately after incrementing the error count for the head 20A-20H in the head error count table 28. Once a head 20A-20H has been determined to be faulty, a reference to the head is added to the faulty head list 30. The disk controller 22 preferably continues to allow read operations but disallows write operations to the physical blocks associated with a head in the faulty head list 30. Attempting to read data through a head 20A-20N that has been determined to be faulty may occasionally be successful, depending on how damaged the head 20A-20N or associated platter surface 18A-18N is. Attempting to recover some data through a faulty head may, or may not be an effective way of recovering some of the data associated with the faulty head depending on whether the affected data can be restored or recovered more easily some other way.

Exemplary logic flow 31 for enabling a disk controller 22 to determine if a head should be regarded as faulty is shown in FIG. 4. The logic flow starts at 32. At 34, the disk controller 22 (FIG. 2) encounters an error while trying to write to or read from a physical block 19 (FIG. 3). The cause of a read or write error may be a defective platter surface 18A-18H (FIG. 2), a defective head 20A-20H (FIG. 2), or other causes. The logic flow 31 assumes that read or write errors are attributable to a head 20A-20H. The disk controller 22 then, at 36, informs the host computer 10 (FIG. 1) of the error. The disk controller 22 consults the block-head table 26 (FIG. 2) to determine which head is associated with the physical block at which the error occurred, at 38. At 40, the disk controller 22 increments the error count for the head (determined from 38) in the head error count table 28 (FIG. 2). The disk controller 22 then checks to see if the error count for the head exceeds the predetermined threshold at 42. If the determination at 42 is affirmative, then at 44 the disk controller 22 adds the head to the faulty head list 30 (FIG. 2). At 46 the disk controller 22 informs the host computer 10 that the head is faulty, and the logic flow ends at 48. The end at 48 is also reached if the determination at 42 is negative.

There are different ways that the disk controller 22 could inform the host computer 10 of the faulty head. The disk controller 22 can send an error code to the host computer 10 indicating that the disk controller 22 has determined a head to be faulty. A disk controller 22 is likely to determine a head of the disk to be faulty while processing a read or write operation. In this situation, the disk controller 22 can respond to the host computer with an error code indicating a read or write error along with information indicating a detected failure of a head.

Mass data storage system 15 as described relies on the disk controller 22 of each of the disks 16A-16N to determine if a head of one of the disks 16A-16N is faulty. Alternatively, other components in the mass data storage system could perform the determination as described below.

Figure 5:
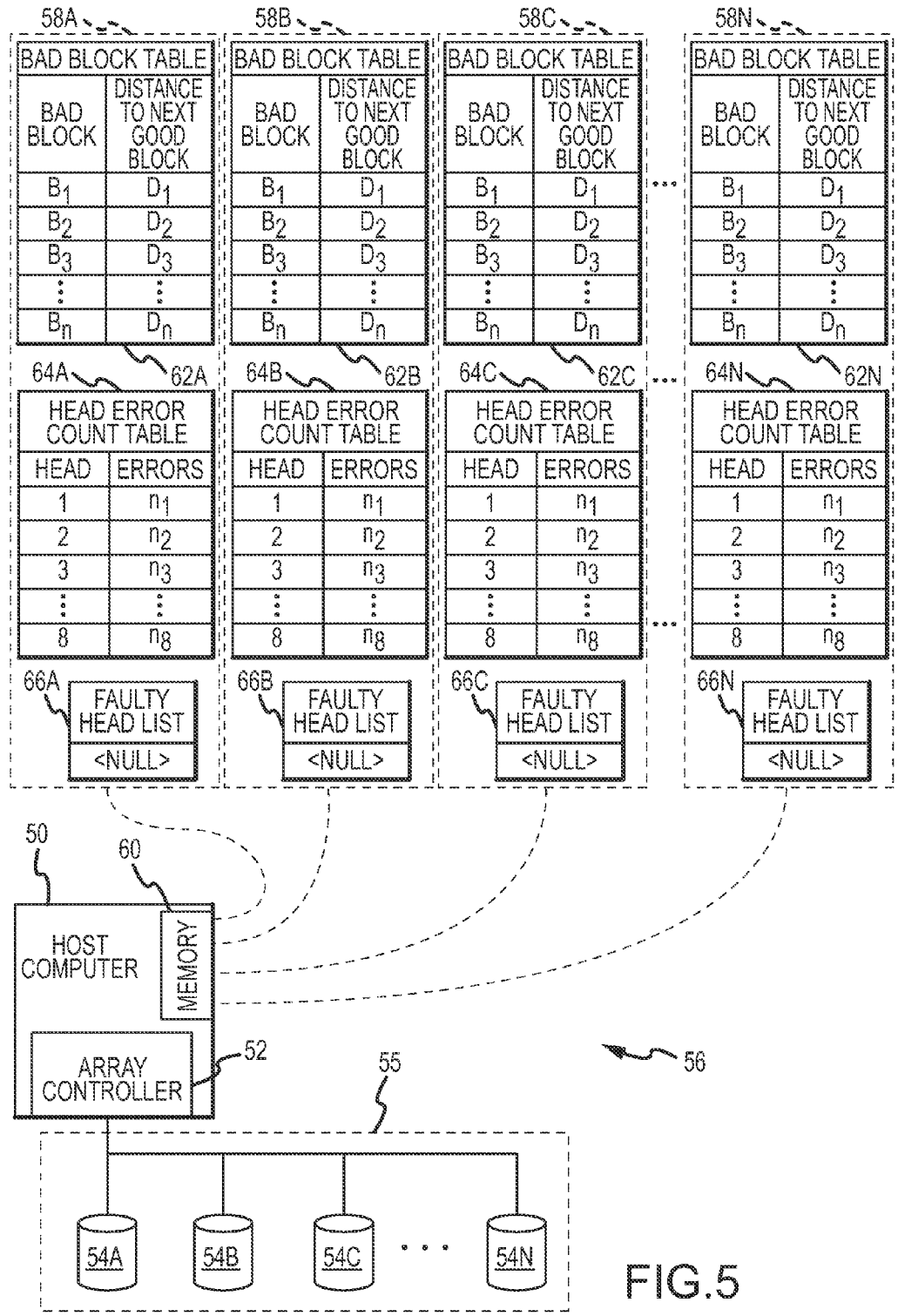
FIG. 5 is a simplified block diagram of a host computer and a striped parity disk array ("SPDA") containing a plurality of disks incorporating the present invention.

A host computer 50 containing an array controller 52, and a plurality of disks 54A-54N are shown in FIG. 5 and are collectively referred to as mass data storage system 56. The host computer 50 of mass data storage system 56 determines heads of disks 54A-54N to be faulty instead of the disk controllers performing the determination. The host computer 50 communicates with the plurality of disks 54A-54N. The plurality of disks 54A-54N make up an SPDA 55 which is managed by the array controller 52. The array controller 52 is implemented in software, but could also be implemented in hardware, such as with a raid controller adapter card. The disks 54A-54N are conventional except that they do not enter into a fault mode when one of the heads (not shown) of the disks 54A-54N becomes faulty. One set of three data structures 58A-58N reside in the memory 60 of the host computer 50 for each attached disk 54A-54N. Each set of data structures 58A-58N contain one each of a bad block table 62A-62N, a head error count table 64A-64N and a faulty head list 66A-66N.

The bad block tables 62A-62N store information about groups of bad blocks, which is used by the host computer 50 to avoid sending I/O commands to the corresponding disk 54A-54N involving those bad blocks. The bad block tables 62A-62N associate a bad block B1-BN with the distance D1-DN to the next good block.

"Distance" as used herein, is not a physical distance, but rather the number of blocks from a particular bad block B1-BN to the next good block in the logical block address (LBA) space. A block on a disk 54A-54N is considered to be a bad block when the disk controller 22 cannot read from that particular block. When the disk controller 22 discovers a bad block, the disk controller 22 sends an error communication informing the host computer 50 of the read error which includes the block number of the bad block and the distance to the next known good block. The host computer 50 then adds the block number of the bad block B1-BN to the bad block table along with the distance D1-DN from the bad block B1-BN to the next known good block. The disk controller 22 determines the distance to the next good block by attempting to read the physical block corresponding to the next logical block(s) in the logical block address space until the read operation is successful. Alternatively, the disk controller 22 can use heuristics to identify the most likely next good block, instead of attempting to read each block in the LBA space sequentially.

Similarly to supplying the host computer 50 with the distance to the next good block from a bad block B1-BN, the disk controller 22 could instead supply the last bad block of a range of bad blocks starting with the block related to a read error. Either supplying the host computer 50 with the last bad block of a range of bad blocks or the next good block after the range of bad blocks gives the host computer 50 information concerning a range of bad blocks which the host computer 50 can then use to avoid the range of bad blocks.

The head error count tables 64A-64N track the number of errors for each head 1-8 of the disks 54A-54N. The information in the head error count tables 64A-64N is used by the host computer 50 to determine if a head is faulty. The errors in the head error count table correspond to the read errors associated with bad blocks. In order for the host computer 50 to track the number of errors for each head of a disk, the host computer 50 must have some way of associating logical blocks with heads. The host computer 50 can associate logical blocks with heads by querying a drive to translate a logical block address to a Cylinder Head Sector (CHS) (physical) address. When the host computer 50 receives the CHS address corresponding to a bad logical block, the host computer 50 extracts the head number from the CHS address and has then determined the head associated with the logical block. The host computer 50 queries the disk controller 22 for the CHS address of a logical block in response to receiving an error from the disk controller 22 concerning that logical block. The host computer 50 then extracts the head number from the CHS address and increments the error count associated with that head in the head error count table 64A-64N corresponding to the disk.

Figure 6:
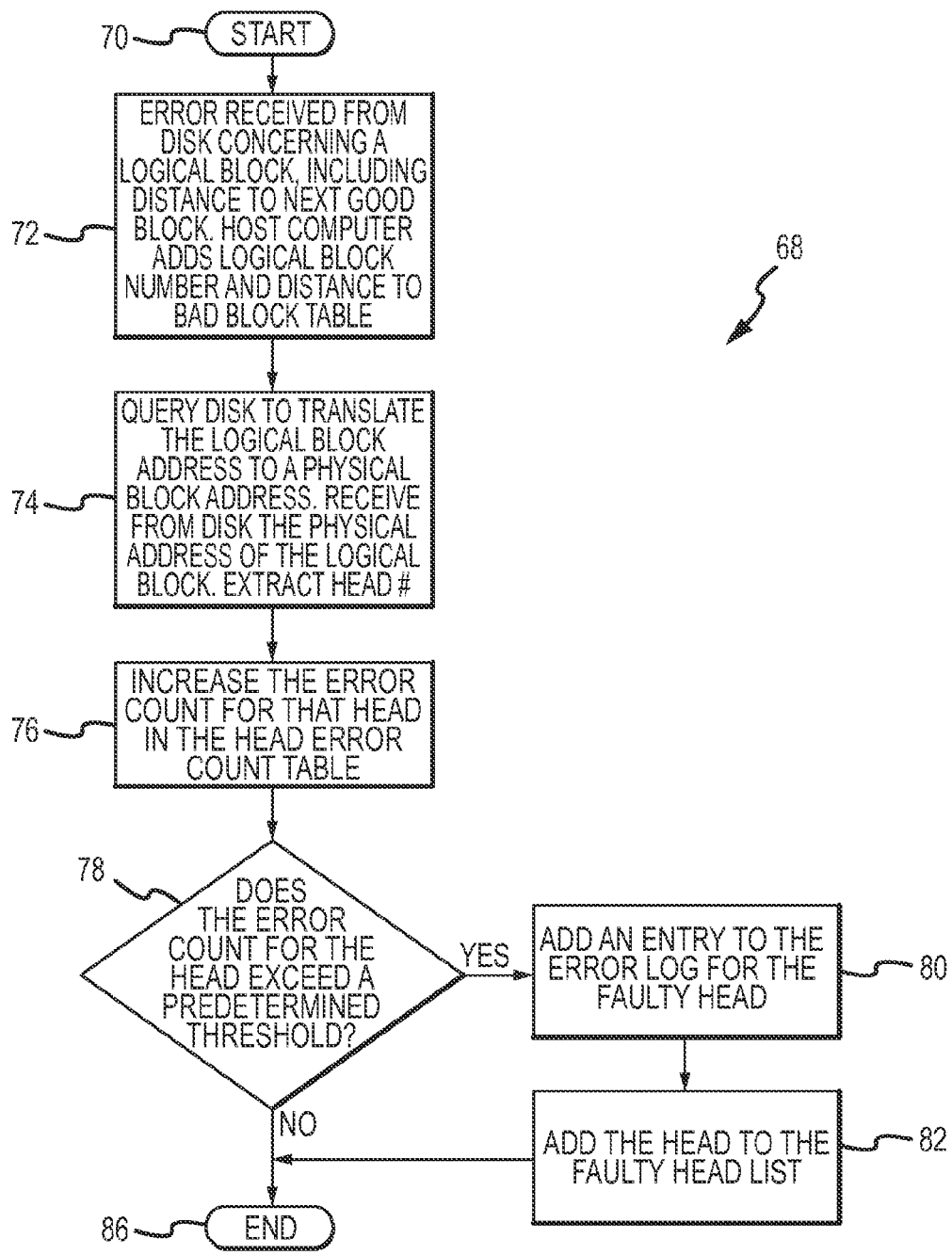
FIG. 6 is a flowchart of exemplary logic executed by an array controller, processor, or host computer of an SPDA of the type shown in FIG. 1, for detecting a faulty head of the disk shown in FIG. 2.

Exemplary logic flow 68 for the host computer 50 to determine if a head is faulty is shown in FIG. 6. The logic flow starts at 70 and is executed every time the host computer 50 receives an error communication from a disk. The host computer 50 receives an error from a certain disk, e.g. disk 54A (FIG. 5) concerning a certain logical block, e.g. block X at 72. The error received from the disk 54A includes the distance to the next good block, and both block X and the distance to the next good block are added to the bad block table 62A. At 74, the host computer 50 queries the disk 54A for the physical address (in CHS format) of the logical block X, the disk 54A responds to the query with the physical address, and the host computer 50 extracts the head number associated with the logical block X from the physical address. The host computer 50 then, at 76, increments by one the error count associated with the head in the head error count table 64A (FIG. 5), which is associated with disk 54A. The host computer 50 then checks to determine if the error count for the head is greater than a predetermined threshold at 78. If the determination at 78 is affirmative, then at 80 the host computer 50 adds an entry to an error log indicating that the head on the disk 54A is faulty. At 82, the host computer 50 adds the head to the faulty head list 66A (FIG. 5), which is associated with the disk 54A. The logic flow ends at 86, after 82 or if the determination at 78 is negative.

The preferred response by the host computer 50 after making a determination that a disk is partially failed (contains a faulty head) is to attempt to read data from the heads of the disk that are not faulty in order to copy as much data as possible from the partially failed disk to a spare disk. The host computer 50 can attempt to avoid reading data from the faulty head of the disk by avoiding the bad block ranges defined in the bad block tables 62A-62N. The host computer 50 can read data from the non-faulty heads of the partially failed disk by attempting to read from all of the logical blocks of the partially failed disk that are not within the bad block ranges. In the event that the bad block ranges do not cover all of the blocks associated with the faulty head and the host computer 50 attempts to read blocks associated with the faulty head, the disk will either read those blocks or return a read error along with the distance to the next good block. Preferably, the partially failed disk has a minimum read retry operating mode the host computer 50 can set the disk to when the host computer 50 determines the disk to be partially failed so that the disk can determine as quickly as possible which blocks are likely to be unreadable.

Figure 7:
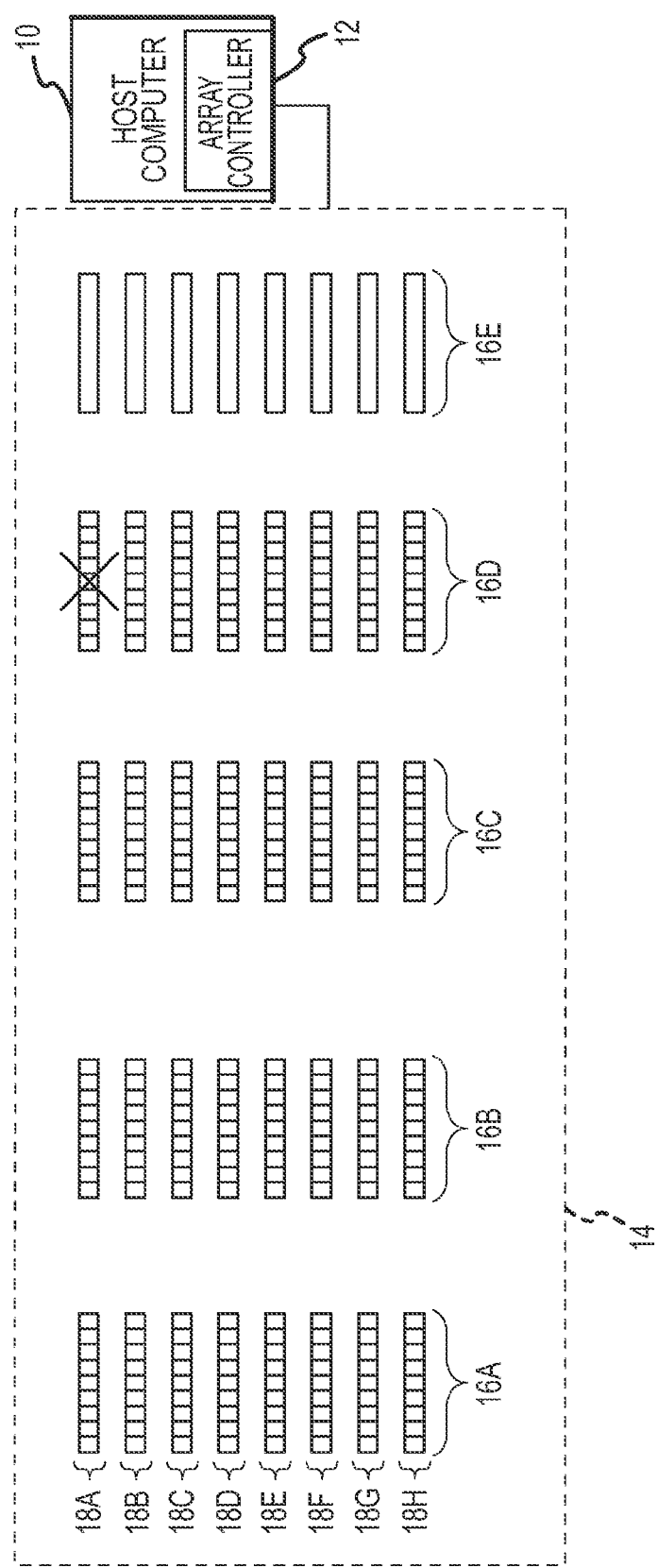
FIGS. 7, 8 and 9 are block illustrations of the platters of multiple disks of the SPDA array shown in FIG. 1, illustrating different stages of an improved SPDA rebuild process according to the present invention.
Figure 8:
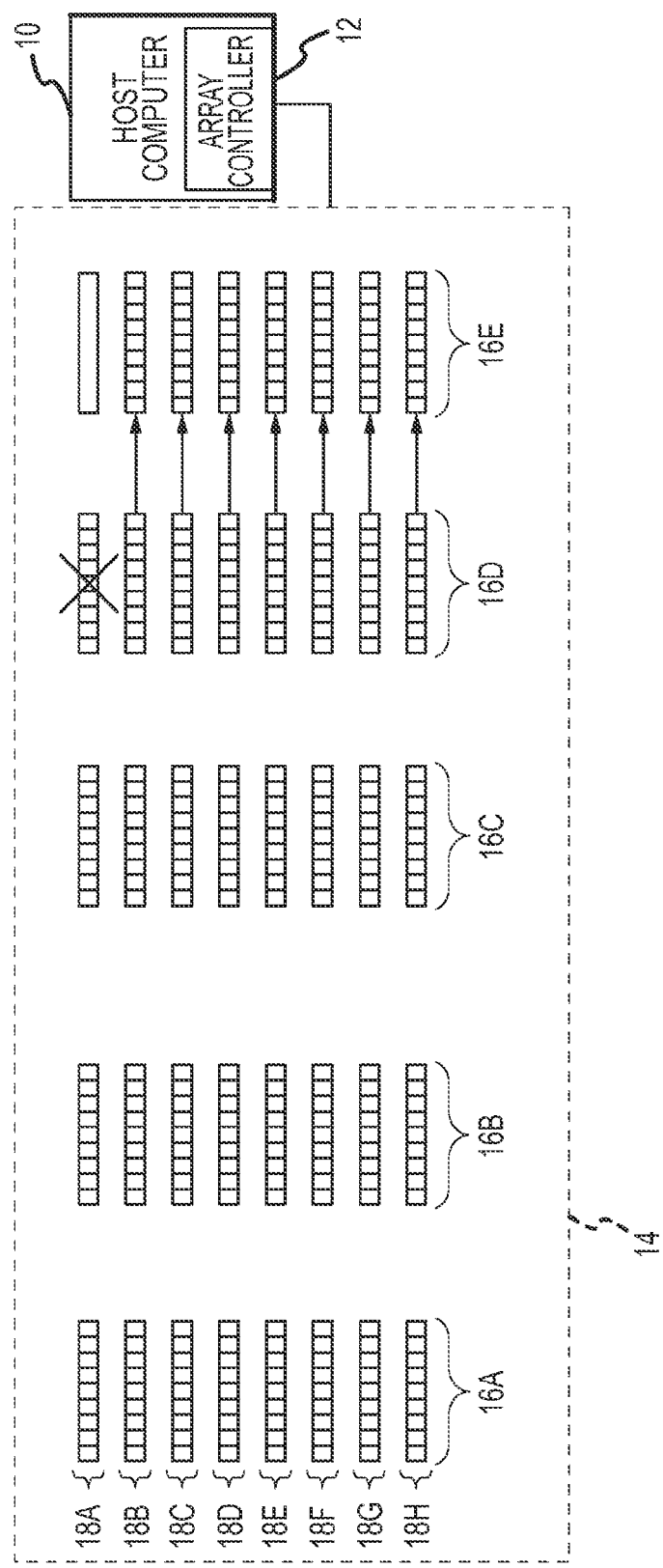
Figure 9:
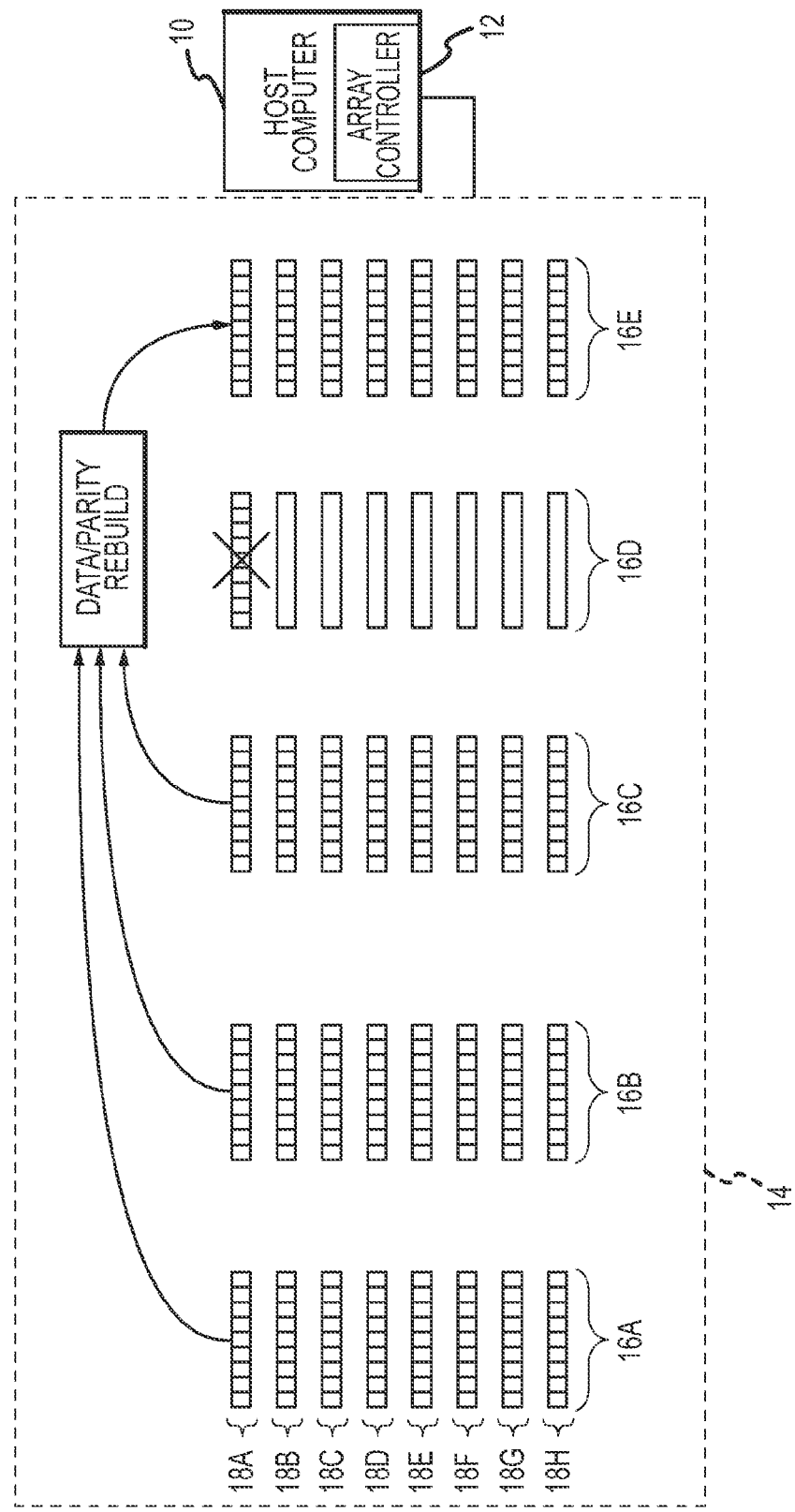

When an SPDA comprises disks which continue to operate with a partial disk failure, and the disks (or host computer) are able to determine the disk to have a faulty head and the host computer has a way to attempt to avoid reading data from the faulty head of the disk with the partial failure, it is possible to reduce the time the SPDA spends in degraded mode when a disk has partially failed due to a faulty head which does not impair the operation of the remaining heads of the disk. FIGS. 7-9 illustrate an improved method for reducing the time an SPDA spends in degraded mode, in accordance with the present invention. Five disks 16A-16E are shown in FIG. 7. Each of the disks 16A-16E is exemplified as having eight platter surfaces 18A-18H, represented by vertical stacks of horizontal bars. Disks 16A-16E are part of array 14, which is a striped parity disk array. The array 14 is connected to a host computer 10 which contains an array controller 12 which manages the array 14. Disks 16A, 16B, 16C, and 16D are member disks of the array 14. All four member disks 16A-16D of the array 14 have data or parity information on all of their individual platter surfaces 18A-18H as indicated by vertical dashes within the bars representing the platter surfaces 18A-18H. Disk 16E is a hot spare disk of array 14 and has no data on it. The data on platter surface 18A of disk 16D is illustrated as being unavailable (as shown by the "X" through the platter surface) as a result of a faulty head. Upon determining that the head that performs read and write commands to platter surface 18A is faulty, as described above, the disk controller of disk 16D communicates to the array controller 12 that disk 16D has a faulty head. Alternatively, the host computer 10 determines that disk 16D has a faulty head.

The array controller 12 then copies the data from disk 16D that resides on platter surfaces 18B-18H of disk 16D to the spare disk 16E as shown by arrows in FIG. 8. The data is copied from disk 16D to disk 16E while keeping the data in the same logical block numbers from which it came. To allow write operations to the array 14 from the host computer 10 during the copy operation, a conventional mirroring copy process copies the data to platter surfaces 18B-18H of disk 16E from platter surfaces 18B-18H of disk 16D. A mirroring copy process involves creating a mirror by adding a first element, such as a disk or platter surface, to be copied from and a second element to be copied to; synchronizing the mirror, so that the data is copied from the first element to the second element and the data on the second element reflects subsequent changes made on the first element; and then removing the first element from the mirror (typically referred to as "breaking the mirror"), which also removes the data from the first element. The end result of a mirroring copy process is that the data has moved from the first element to the second element, or as is the case here, from one disk to another. The mirroring copy process allows data to be copied from the accessible platter surfaces of disk 16D to disk 16E and also updates the mirrored copy on disk 16E if any changes to the data are subsequently made on disk 16D. Once the mirroring copy process is complete, the mirror is broken and the data that previously resided on platter surfaces 18B-18H of disk 16D then resides on platter surfaces 18B-18H of disk 16E.

The array controller 12 also rebuilds the data for platter surface 18A of disk 16E from the data and parity information on platter surface 18A of disks 16A-16C as shown in FIG. 9. This rebuild process is much faster than rebuilding data for the entire disk 16E, since only the data for a single platter surface 18A of disk 16E is being rebuilt compared to rebuilding the entire data on platter surfaces 18A-18H of disk 16E. Disk 16D can thereafter be removed from the array 14 and replaced with a fully functional spare disk after all of the data that can be copied from disk 16D is copied.

Enabling a disk in an SPDA, such as array 14, to continue to operate as a partially failed disk when the disk encounters a serious error such as a head failure, significantly reduces the time the SPDA operates in degraded mode compared to an SPDA which does not permit partially failed disks to operate. The less time an SPDA spends in degraded mode, the less chance that the SPDA will experience a subsequent disk failure causing the data on the SPDA to become unrecoverable. Reducing the time the SPDA spends in degraded mode also reduces the extent of the adverse performance impact suffered by applications which rely on the SPDA. These and other improvements and advantages will be more apparent after comprehending the full ramifications of the present invention.

A presently preferred embodiment of the present invention and many of its improvements have been described with a degree of particularity. This description is a preferred example of implementing the invention, and is not necessarily intended to limit the scope of the invention. The scope of the invention is defined by the following claims.

What is claimed is:

1. A method reducing the risk of data becoming unrecoverable in a data storage system including a plurality of data storage devices, each data storage device having a plurality of physical blocks to which data is written to in write operations and from which data is read in read operations, each data storage device having a plurality of block groups each associated with a subset of the plurality of physical blocks, the method comprising:
   recognizing read errors occurring in response to read operations;
   associating one of the block groups with each read error;
   counting the number of read errors associated with each block group;
   determining any one block group to be faulty when the counted number of read errors for that any one block group exceeds a predetermined threshold value, the data storage device having the block group determined to be faulty constituting a partially failed data storage device;
   and upon determining any one block group of any one of the plurality of data storage devices to be faulty:
      copying data from data blocks of non-faulty block groups of the partially failed data storage device to at least one of the other data storage devices within the data storage system; and
      restoring data that was previously stored in data blocks of the block group determined to be faulty on the partially failed data storage device to at least one of the other data storage devices within the data storage system, the data restored not being copied directly from the block group determined to be faulty.

2. A method as defined in claim 1, further comprising:
   storing redundant data information among the plurality of data storage devices; and
   restoring the data that was previously stored in the data blocks of the block group determined to be faulty on the partially failed data storage device to the other data storage devices using the redundant data information stored among the plurality of data storage devices excluding the partially failed storage device.

3. A method defined in claim 2, wherein the redundant data information comprises parity information, the method further comprising:
   determining parity information for the data to be written in each write operation;
   writing the data for each write operation to at least one of the plurality of the data storage devices; and
   writing the determined parity information to a separate one of the data storage devices other than the at least one of the plurality of data storage devices to which the data for the write operation is written.

4. A method as defined in claim 1, wherein:
   each data block of each data storage device is associated with only one block group.

5. A method as defined in claim 4, wherein one of the data storage devices is designated as a spare data storage de-Ace, the method further comprising:
   copying data from data blocks of non-faulty block groups of the partially failed storage device to the spare data storage device; and
   restoring the data that was previously stored in the data blocks of the block group determined to be faulty onf the partially failed data storage device to the spare data storage device.

6. A method as defined in claim 4, further comprising:
   preventing continued write operations to the physical blocks of any block group determined to be faulty.

7. A method as defined in claim 1, further comprising:
   performing read and write operations with respect to the non-faulty block groups of any one of the data storage devices after the any one block group of the any one data storage device has been determined to be faulty.

8. A method as defined in claim 1, wherein each data storage device has a plurality of data blocks assigned to a spare block group which are not initially used in read and write operations, further comprising:
   remapping read and write operations from any physical block of one of the block groups other than the spare block group to physical block of the spare block group when the physical block of the one block group becomes incapable of at least one of the reliably reading or writing data.

9. A method as defined in claim 1, wherein the data storage system is connected to a computer which initiates the read and write operations, the method further comprising:
   communicating to the computer information identifying any block group determined to be faulty.

10. A method as defined in claim 9, further comprising:
    determining by the computer any one block group to be faulty.

11. A data storage system comprising:
    a plurality of data storage devices which are organized into an array, at least one of the data storage devices being designated as a member data storage device and at least one of the plurality of data storage devices being designated as a spare data storage device, each of the data storage devices having a plurality of physical blocks for storing data during write operations and for supplying data during read operations, a plurality of block groups each being associated with a different plurality of the physical blocks for each of the data storage devices;

a device controller of each data storage device which recognizes read errors occurring during read operations to any one physical block and which designates any one of the block groups as faulty when the read errors for the physical blocks of the block group meet a predetermined threshold;

an array controller which communicates with each device controller and controls the operation of each data storage device in the array during the read and write operations, the array controller controlling the device controllers of the spare data storage device and the member data storage device having the designated faulty block group to (a) read data from the block groups of the member data storage device not designated as faulty and write that data to block groups of the spare data storage device; and (b) to rebuild data onto the spare data storage device written to the block group designated as faulty of the member data storage device; and (c) thereafter perform any subsequent read and write operations on the spare data storage device which would otherwise be addressed to the member data storage device having the designated faulty block group.

12. A data storage system as defined in claim 11, wherein:
at least two of the plurality of data storage devices are member data storage devices;
the array is a parity array in which parity information is recorded on at least one of the member data storage devices to create redundancy; and
the array controller rebuilds the data on the spare data storage device from the data and the parity information of the member data storage devices other than the member data storage device having the block group designated as faulty.

13. A data storage system as defined in claim 12, wherein the data written to the member data storage devices is stripped across at least two member data storage devices.

14. A data storage system as defined in claim 11, wherein:
the device controller of the member data storage device having the designated faulty block group prevents further read and write operations to the physical blocks of the block group designated as faulty after that block group has been designated as faulty.

15. A data storage system as defined in claim 14, wherein the device controller of the member data storage device having the designated faulty block group performs continued read and write operations to the physical blocks of the block groups not designated as faulty.

16. A data storage system as defined in claim 11, wherein:
each block group is associated with a plurality of different physical blocks; and
each physical block is associated with only one block group.

17. A data storage system as defined in claim 11, further comprising:
a computer connected to the data storage system which communicates the write operations to the array controller to store data and which communicates the read operations to the array controller to retrieve data; and wherein:
the array controller communicates to the computer information indicating any one data storage device has been determined to have a faulty block group.

18. A method of reducing the rebuild time of a stripped parity data storage device array, the stripped parity data storage device array comprising at least three member data storage devices across which data and parity information derived from the data is stripped, the stripped data storage device array further comprising a spare data storage device, each member data storage device having a plurality of block groups to which data is written in write operations and from which data is read in read operations, the method comprising:
determining any block group of any member data storage device to be faulty when errors associated with any block group meet a predetermined threshold;
copying data from the non-faulty block groups of the member data storage device having the faulty block group to the spare data storage device; and
restoring data to the spare data storage device that was previously written to the block group determined to be faulty other than by copying the data from the faulty block group.

19. A method as defined in claim 18, wherein each block group of each of the member data storage devices further comprises a plurality of physical blocks, the method further comprising:
performing read operations and write operations to physical blocks;
detecting errors related to at least one of the write operations and read operations performed on the physical blocks; and
associating each physical block related to a detected error with one of the block groups.

20. A method as defined in claim 19, further comprising:
restoring data to the spare data storage device that was previously written to the block group determined to be faulty by rebuilding that data from the member data storage devices other than the member data storage device having the block group determined to be faulty and subsequently writing the rebuilt data to the spare data storage device.

* * * * *